UNITED STATES PATENT OFFICE.

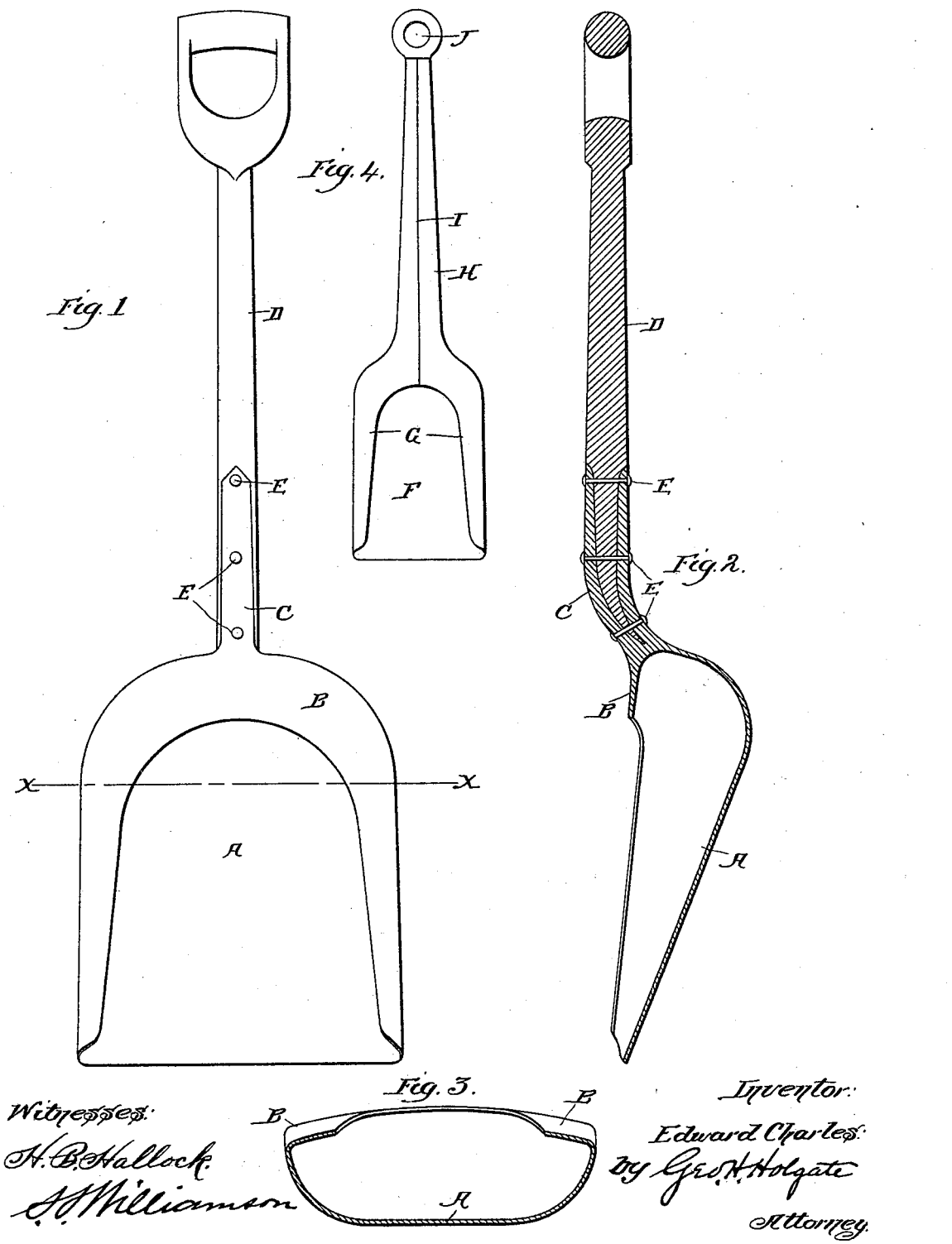

EDWARD CHARLES, OF NORRISTOWN, PENNSYLVANIA.

SHOVEL.

SPECIFICATION forming part of Letters Patent No. 594,778, dated November 30, 1897.

Application filed January 25, 1897. Serial No. 620,646. (No model.)

*To all whom it may concern:*

Be it known that I, EDWARD CHARLES, a citizen of the United States, residing at Norristown, in the county of Montgomery and State of Pennsylvania, have invented a certain new and useful Improvement in Shovels, of which the following is a specification.

My invention relates to a new and useful improvement in shovels, and has for its object to produce an improved shovel especially adapted to the handling of fine coal for steam-boilers, wagons, or stoves or the handling of grain in bulk without the loss of the same by scattering over the sides of the shovel.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1 is a front view of a shovel made in accordance with my improvement of a size well adapted for handling grain or coal in large quantities; Fig. 2, a central longitudinal section thereof; Fig. 3, a section at the line $x\ x$ of Fig. 1; and Fig. 4 illustrates a shovel for domestic use, such as the feeding of stoves or furnaces.

In carrying out my invention, as shown in Figs. 1, 2, and 3, I provide a scoop or bowl A and form therewith an inturned flange B, which extends from the front edge of the shovel around the sides and back thereof, as clearly shown in Fig. 1, and is preferably wider at the rear than at the front. Formed with the shovel is a suitable shank C, by means of which the handle D is secured thereto in any desirable manner, here shown as having the rivets E passed therethrough.

It will be seen that a shovel thus made when utilized for handling fine coal, grain, or like substances will retain the same against overflow from the sides of the shovel and permit their delivery to a wagon, bin, or furnace without spilling or scattering, and for certain classes of work this is of great importance, as much time and material will be saved thereby.

The shovel may be made by any desirable process, the shank being formed thereon by forging or the proper bending of sheet metal, the only essential being that the completed shovel shall be provided with a flange of sufficient width to prevent the overflow of the material handled thereby.

The shovel shown in Fig. 4 is especially adapted for domestic use and is made of a single piece of sheet metal so bent as to provide the scoop F, flanges G, and handle H, and, if desired, where the metal overlaps, as indicated at I, it may be riveted or otherwise secured together. An eye J is preferably formed at the outer end of the handle for convenience in suspending the shovel from a nail or hook.

The cost of producing a shovel in accordance with my improvement is substantially the same as that for the manufacture of shovels of ordinary construction, while my improvement offers many advantages over the old form of shovel, one of which is when fine coal is being fed to a furnace the door of which is narrow in proportion to the size of the shovel the coal may be delivered with certainty to the fire-bed without the liability of its missing the mark and being scattered upon the floor, and still another advantage is that in furnaces with long fire-boxes the fuel may be thrust to the rear thereof, since the shovel by means of its flange is made capable of giving more momentum to the fuel without spilling the same, and this is also true in the handling of grain, since each shovelful of said grain may be thrust to a greater distance on account of the superior hold which this shovel has thereon over shovels of ordinary construction.

The flange, while having for its object primarily to assist in the retention of the material handled by the shovel, also serves to strengthen the latter and add rigidity thereto without materially increasing its weight, or when a shovel is made of the same strength as those of usual form the weight thereof will be considerably less.

Having thus fully described my invention, what I claim as new and useful is—

In a shovel, a bowl formed of a single piece of sheet metal, a handle also of sheet metal formed with the bowl, the sides of the shovel being turned up and over forming flanges overhanging the bowl, said upturned sides meeting along the handle and forming a rounded grip, substantially as described.

In testimony whereof I have hereunto affixed my signature in the presence of two subscribing witnesses.

EDWARD CHARLES.

Witnesses:
S. S. WILLIAMSON,
F. MATTNER.